Figure 1:
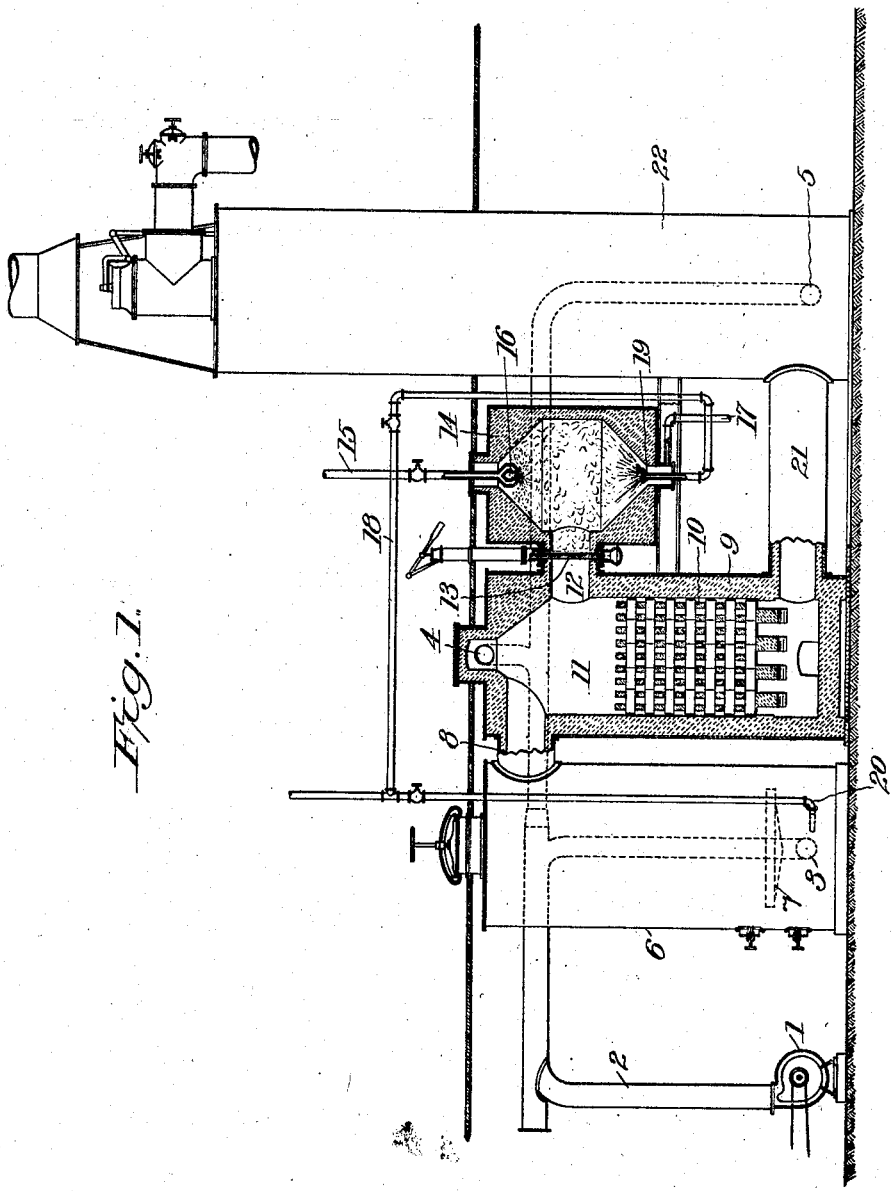

H. L. DOHERTY.
PROCESS OF MAKING GAS.
APPLICATION FILED FEB. 8, 1907. RENEWED JULY 6, 1908.

911,869.

Patented Feb. 9, 1909.
2 SHEETS—SHEET 1.

WITNESSES:

INVENTOR.
Henry L. Doherty
BY
ATTORNEYS

H. L. DOHERTY.
PROCESS OF MAKING GAS.
APPLICATION FILED FEB. 8, 1907. RENEWED JULY 6, 1908.

911,869.

Patented Feb. 9, 1909.
2 SHEETS—SHEET 2.

WITNESSES:
C. H. Walker.
Alfred M. Houghton.

INVENTOR.
Henry L. Doherty
BY
Marble & McElroy
ATTORNEYS

UNITED STATES PATENT OFFICE.

HENRY L. DOHERTY, OF NEW YORK, N. Y.

PROCESS OF MAKING GAS.

No. 911,869.  Specification of Letters Patent.  Patented Feb. 9, 1909.

Application filed February 8, 1907, Serial No. 356,413. Renewed July 6, 1908. Serial No. 442,249.

*To all whom it may concern:*

Be it known that I, HENRY L. DOHERTY, a citizen of the United States, residing at New York, in the county of New York and State of New York, have invented certain new and useful Improvements in Processes of Making Gas; and I do hereby declare the following to be a full, clear, and exact description of the same, such as will enable others skilled in the art to which it appertains to make and use the same.

This invention relates to processes of making gas and consists in a method of making water gas from ignited fuel by a succession of alternate air and steam treatments, the air treatment being so conducted as to accumulate a maximum of sensible heat in the fire bed, and the steam treatment prolonged for a greater period than is customary; of using the sensible heat of the products escaping from the particular air blow stated to heat a refractory region; and of enriching said water gas produced in the steam treatment in such refractory region by misted oil; all as more fully hereinafter set forth and as claimed.

In the art of making water gas it is customary to blow a deep bed of ignited fuel alternately with air and with steam, the first blow being so conducted as to yield a gas with a large amount of CO; generator gas. In making such generator gas about 30 per cent. roughly, of the total heat of combustion of the carbon burned is evolved, part going away with the generator gas and part being stored up in the mass of fuel. This stored heat in the fuel compensates for the chilling and endothermic action of the steam in the steam blow and allows the production of water gas. The length of time during which it is possible to introduce steam and make water gas from the bed of fuel depends on the amount of heat stored up in it during the air blow. By introducing air under accelerated blast and comparatively high pressure the combustion in the producer can be made complete instead of partial as heretofore; and even with a deep bed of fuel the coal may be completely burned to $CO_2$ in lieu of CO, thereby evolving in the fuel in the producer the full hundred per cent. heat yielded by the combustion of carbon. In order to secure this complete combustion, I have discovered, there should be a velocity of draft corresponding to a differential pressure between the twyers and the gas outlet of the producer, of not less than 5 inches per vertical foot of coal in the producer. This may be afforded by a blast pressure between 1 and 5 pounds. Burning of carbon to monoxid and to dioxid is an exothermic reaction and like all exothermic reactions is comparatively rapid. On the other hand reduction of $CO_2$ to CO in the formation of generator gas, is an endothermic reaction and requires considerable time comparatively. Therefore by speeding the air blast through the mass of fuel at a rapid rate, I can secure complete combustion into $CO_2$. With such a complete combustion the amount of heat accumulating in the coal is enormously increased for a given time of blow, or, conversely, for an equal accumulation of heat the time of air blow may be much reduced, and the amount of coal burned to make comparatively useless generator gas or products of complete combustion may be materially reduced. Air introduced under the described pressure, effectually prevents all channeling in the fuel of the producer and produces a substantially even penetration through all parts of the mass of ignited fuel.

In the manufacture of enriched water gas for illuminating purposes, it is customary in the art to conduct the generator gas formed in the ordinary air blow into a checkerwork of refractory material and there burn it to heat said checkerwork by admitting air. Its sensible heat and the heat of combustion together coöperate to heat the refractory checkerwork to an intense degree. Neglecting the influence of the sensible heat of the generator gas for the moment, it may be said that in this ordinary procedure, roughly 30 per cent. of the heat of the carbon which has formed carbon monoxid is developed in the producer and 70 per cent. in the checkerwork. Through the heated checkerwork in this ordinary process the water gas of the steam blow is passed, oil of some kind being simultaneously introduced into the checkerwork chamber through a nozzle or spray, usually so directed as to secure direct contact of the oil and the heated refractory material. The oil on contact with the hot refractory material is cracked with development of less carbonaceous hydrocarbons, more or less free carbon being usually deposited. These less carbonaceous hydrocarbons are cracked and recracked or "fixed" in their passage through the hot checkerwork in company with the water gas, usually with the deposition of considerable carbon at each stage, and finally yield permanent, light-giving hydrocarbon gases. The carbon which is deposited in the checkerwork in these various crackings does not contribute to the luminescence of the gas but is uselessly burned during the succeeding combustion of generator gas in the checkerwork. It is obvious that this is wasteful. The whole object of this carbureting is to put carbon in the form of light giving hydrocarbons in the gas. I have discovered that much of this waste can be avoided and better results secured by running the checkerwork at a lower heat and introducing the oil in a special and particular manner. In the ordinary procedure the cracking operation is, so to speak, too violent; the heating surfaces are too hot and tend to char the oil suddenly rather than crack it in a progressive and methodical manner. Such a high heat, however, in practice has appeared to be more or less necessary with oil introduced in the usual manner, with formation of comparatively large droplets running down upon the first portions of checkerwork encountered. The limitations of this process have moreover heretofore precluded the use of very many cheap and otherwise highly advantageous heavy oils, rich in carbon, such as petroleum residues, still bottoms, tar oils, asphalt oils, and the like. These oils are too highly carbonized and they deposit too much char in the ordinary method of introducing in the form of relatively coarse drops or bodies into a relatively hot region, so that lighter, more expensive oils have been necessary.

In the present method, producing complete combustion in the producer in the air blow, the sensible heat of the gaseous products escaping though comparatively low is enough to heat the checkerwork to the desired degree without producing the undue temperature caused by burning generator gas therein, particularly when the oil for carbureting is introduced therein in a particular way giving indefinitely fine dissemination of the same in the form of microscopic droplets through the water gas before the latter is passed through the said checkerwork. At this lower heat, if the oil is in a misted form, uniformly and thoroughly distributed through the water gas and with each of the very fine droplets surrounded by the hydrogen of the water gas, it is cracked and fixed therein by sensible and radiant heat from the refractory material, without deposition of much or any carbon; without such sooting or charring as occurs when it is cracked on and in contact with the heated refractory material as in the common method. The fog of oil and water gas, the latter of which is largely hydrogen and carbon monoxid, reacts as a whole with the production of much more light-giving hydrocarbon gases than when the oil is cracked per se and its vapors mixed with the water gas, as occurs when the oil in masses comes into actual contact with very refractory material. The hydrocarbons of the oil tend to become hydrogenated in lieu of the oil becoming decarbonized to produce permanent gases. For this reason, by introducing the oil in indefinitely fine misted form, oils containing relatively enormous proportions of carbon, far too much to permit their use in the common procedure, can be employed in this method.

While in the common practice, it is necessary to use oils relatively low in carbon, though the whole purpose of carbureting is to introduce carbon into the gas, and the cheap high carbon oils are unsuitable, in this process these latter bodies are best adapted for the very reason that they do contain much carbon, enabling relatively small amounts to produce efficient carburation.

To produce the desirable indefinitely fine misting of the carbureting oil, I preferably employ special means. These means consist of two intersecting jets of oil, introduced under relatively high pressure, and meeting within a fog chamber in communication with the checkerwork chamber. The meeting jets expend their high energy upon each other with the production of an indefinitely fine mist or fog. The pressure at which this oil is introduced should be between 30 and 300 pounds, this depending upon the size and angle of orifices and upon the consistence of the oil. Any oil which is not so misted and which collects in tangible drops should be caught and removed from the chamber for reintroduction. It is not desirable that the oil-fog produced should contain any such drops of tangible size. Though introduced under such pressure, the oil enters in too small quantity to cause any great movement of the fog laden atmosphere in the fog chamber, and special means must be adopted to cause such fog to enter the carbureting checkerwork. This means is conveniently steam or gas introduced into the fog chamber in such quantity as to cause a suitable forward movement of such fog.

Production of a fog of finely divided oil or tar suspended in an atmosphere of air or gas is useful in many arts, though particularly so in this. For instance, such a fog of oil or tar carried in the appropriate amount of air may be used for feeding internal combustion engines, and the fog drawn into the engine from time to time as the engine requires fuel. The fog once produced is tolerably permanent. Such a fog may also be used for lighting purposes.

To recapitulate, my process consists of an organized succession of steps, each separately useful and together coöperating to produce enriched water gas in an efficient and economical manner. In this succession of steps, the gas producer is blown with an accelerated draft of air in such manner as to produce products of combustion in lieu of generator gas; and these products used to heat a checkerwork to a comparatively low temperature by sensible heat. After blowing up the producer as stated, it is run with steam, the produced water gas passed through the checkerwork and there carbureted with oil or tar misted into and thoroughly admixed with said water gas as a fog prior to entering the checkerwork proper.

In the accompanying illustration is shown, more or less diagrammatically, certain apparatus of the many types adapted to carry out the described process.

Figure 2:
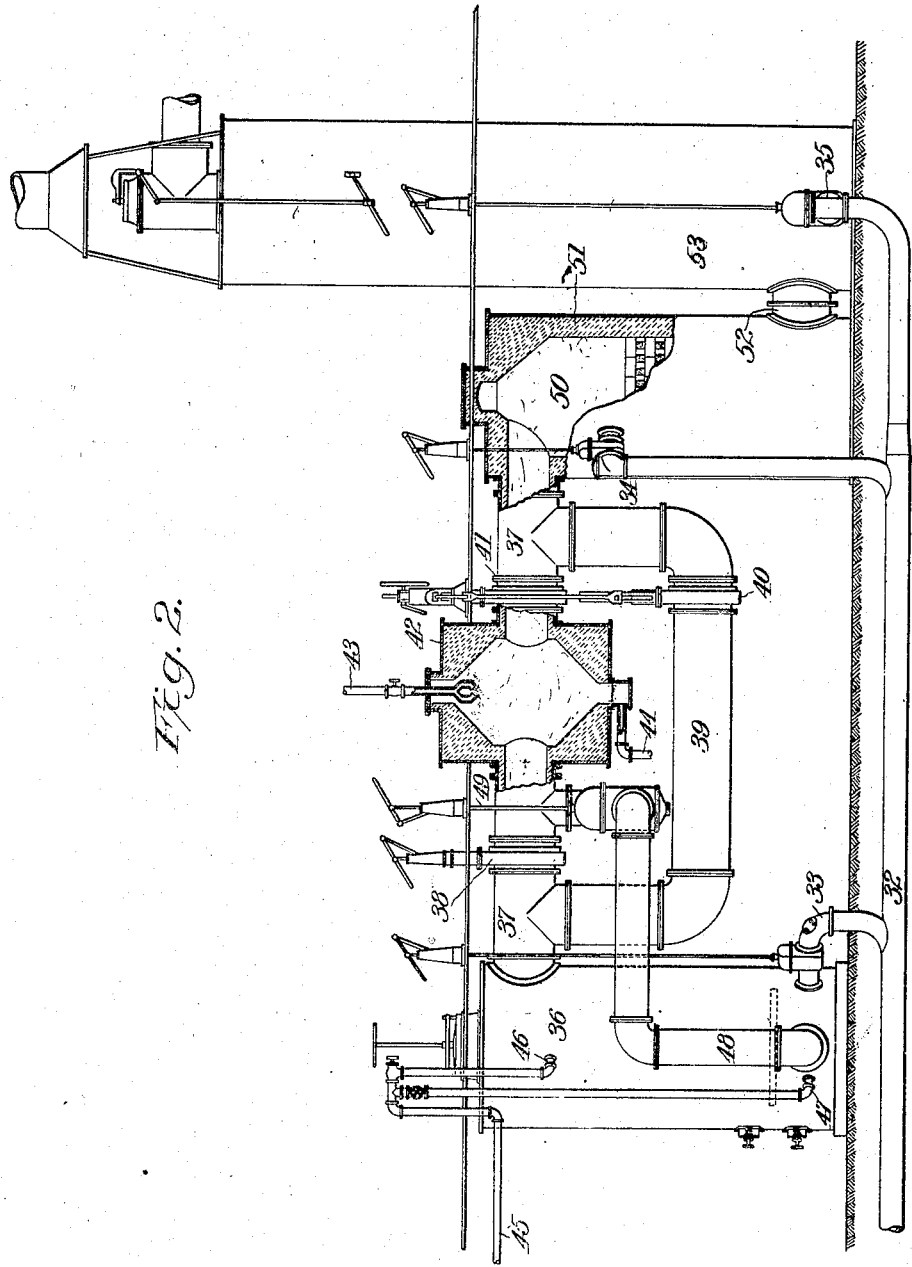

In this showing, Figure 1 is a view, partially in elevation and partly in vertical section of one form of apparatus; and Fig. 2 is a similar view of a modified form.

In Fig. 1, element 1 is a blower furnishing air to conduit 2 from which it may be delivered through outlets 3, 4 and 5, for purposes later described. 6 is a gas producer of ordinary type, provided with an internal grate 7, and delivering gas through outlet 8. Connected to this outlet is a chamber 9, containing a checkerwork 10 of refractory material. This checkerwork does not completely fill the chamber, a comparatively large free space 11 being left above it. Connecting with this free space through inlet 12, provided with valve 13, is a misting or fog chamber 14, removed from the heat in the checkerwork chamber. Entering the upper portion of this misting chamber is an oil pipe 15, provided with twin nozzles, 16, set as here shown, at such a relative angle that the jets impinge on each other, causing the misting action of introduced oil, in the manner described. Drain pipe 17 at the base of the chamber provides for the removal of any drops of oil of appreciable size. The oil thus removed may of course be reintroduced. As the amount of oil introduced in forming a fog in this comparatively large chamber would not suffice to produce an efficient forward movement of said fog, steam pipe 18 is provided with a nozzle 19 within the chamber to produce such forward movement. Branch 20 from the steam pipe enters the producer to furnish steam in making water gas. Gas from the checkerwork charged with misted, partially cracked and gasified oil goes forward through conduit 21 to a second checkerwork chamber 22 of ordinary construction.

In Fig. 2, the operation is substantially the same save that the water gas from the producer is itself used to produce the forward movement of the oil fog from the misting chamber, the misting chamber being placed between the producer and checkerwork chamber and a special by-pass being provided for the hot products of complete combustion from the producer so that they need not pass through such misting chamber and heat it unduly. In Fig. 2, conduit 32 furnishes air to outlets 33, 34 and 35 for purposes later described. 36 is a gas producer. Gas leaves the producer through the gas conduit 37, valved by 38, and provided with a bypass 39 valved at 40. A valve 41 in the gas conduit is connected to operate in unison with valve 40, but to close when valve 40 opens, and vice versa. Between the two valves in the gas conduit is a misting chamber 42, provided with oil introducing pipe 43 and drain pipe 44. Returning to the description of the producer, this is provided with a steam pipe 45 arranged to introduce steam either above or below the fuel at 46 and 47 respectively. Supplementary gas conduit 48, valved at 49, allows gas to be drawn off from the bottom of the producer when the latter is run with steam introduced above the fuel, and sent into the main gas conduit. The main gas conduit beyond the misting chamber delivers gas into the free space 50 of a checkerwork chamber 51, similar to that in Fig. 1 and thence through 52 into a second checkerwork chamber 53.

By reason of the supplemental air connections 4 and 5 in Fig. 1 and 34 and 35 in Fig. 2, the apparatus shown can be run in the ordinary way, combustible gas being formed in the producer and burned in the two checkerworks, if in any emergency it should be so desired. The misted oil is advantageous in such ordinary operation also. But I prefer to keep these supplemental air connections closed and run the producer under accelerated draft, as described, to produce products of combustion in lieu of combustible gas in the air blow, thereby maintaining a maximum temperature in the producer where high heat is useful and a much lower temperature in the checkerwork chamber where a lower heat is preferable in working with misted oil. Such a high heat in the checkerwork chamber as is produced in the ordinary method of burning generator gas therein though practically necessary when introducing oil in a comparatively gross form is unnecessary and disadvantageous in introducing the misted oil as leading to carbonization rather than hydrogenation of the said oil.

In conducting the process in the preferred way, with the apparatus of Fig. 1, during the air blow stage, valve 13 is kept closed and introduction of carrying steam through 19 is discontinued. When the producer is run with steam, the valve 13 is opened and carrying steam sent into the misting chamber. With the apparatus of Fig. 2, the products of combustion formed during the air blow are by-passed around the misting chamber by 39. During running with steam the water gas produced is introduced into the misting chamber by 37, but as the cross-section of this chamber is much larger than that of the conduit, the velocity of passing gas is much slackened in transit therethrough, producing a gentle forward movement which permits thorough incorporation of gas and fog and does not prevent descent of any comparatively gross oil globules which may be formed. It will be noted that the misting nozzles are placed well above the axis of conduit 37.

In the operation of the producer, it is sometimes deemed better to alternate updraft and downdraft in the water gas stage of the operation and steam inlets 46 and 47 permit this. In the updraft operation, the main gas conduit 37 is employed; in the downdraft, supplemental gas conduit 48.

In both forms of apparatus shown, the operator is able to keep the misting or fog chamber at a comparatively low temperature, the comparatively hot products of complete combustion from the producer during the air blasting not passing through it. This is desirable in the process of the present invention since it is preferable to form the fog of oil prior to applying heat to it to carburet the water gas, high heat having a tendency to separate carbon from comparatively large drops of the heavy oils which are generally employed. For this reason before applying the carbureting heat in the checkerwork it is preferable to form a fog of excessively minute droplets first, carefully removing all droplets of sensible size. In the structure of Fig. 1 the misting or fog chamber is completely removed from the path of the gases from the producer and the fog only introduced into the water gas current after its formation while in the structure of Fig. 2, the very hot products of complete combustion are shunted through a by-pass and do not go through the fog chamber, leaving only the cooler water gas to pass therethrough.

Working with an oil fog such as is produced in the present invention it is also desirable that the checkerwork chamber, wherein the real carbureting is done, should operate at a lower temperature than is customary. Such a lower temperature therein is secured by the described method of operating the producer to secure complete combustion therein and heating the checkerwork only by the sensible heat of the products of complete combustion instead of burning generator gas therein as is usual, the particular way of running the producer and particular way of producing an oil fog coöperating and enabling the manufacture of good gas from comparatively small quantities of comparatively cheap heavy or tarry oils; oils hitherto deemed unsuitable for enriching gas. It is desirable that the checkerwork be at a comparatively low temperature, which is secured by producing complete combustion in the producer, that a good permanent oil fog be produced and thoroughly intermixed with the water gas to form a fog of infinitely fine droplets of suspended oil and that this fog be exposed to the comparatively low temperature of the checkerwork. And it is undesirable that this fog be exposed to any very high heat while still containing comparatively large drops of oil as such drops would char with production of carbon. The object of the process is to hydrogenate heavy oils by heating them in a fine fog in the presence of hydrogen rather than to decarbonize by heating to a charring heat.

What I claim is:—

1. The process of making water gas which consists in blowing up a producer with an accelerated air draft current introduced at such pressure and speed as to form substantially only carbon dioxid in the producer, passing the products of complete combustion so formed through a refractory region to heat the same to a comparatively low temperature by the sensible heat of such products of complete combustion, running the producer with a draft current containing steam, admixing the thus produced water gas with a fog of misted oil free of droplets of sensible size, droplets of sensible size being settled out of said fog and removed prior to any cracking action upon the same, and then passing the fog of water gas and oil through the heated refractory region to carburet said gas.

2. The process of making water gas which consists in blowing up a producer with an accelerated air draft current introduced at such pressure and speed as to form substantially only carbon dioxid in the producer, passing the products of complete combustion so formed through a refractory region to heat the same to a comparatively low temperature by the sensible heat of such products of complete combustion, running the producer with a draft current containing steam to produce water gas, misting heavy oil to produce a fog free of droplets of sensible size, droplets of sensible size being settled out of said fog and removed prior to any cracking action upon the same, admixing such fog with the water gas and then passing the fog of water gas and oil through the heated refractory region to carburet said gas.

3. The process of making water gas which consists in blowing up a producer with an accelerated air draft current introduced at such pressure and speed as to form substantially only carbon dioxid in the producer, passing the products of complete combustion so formed through a refractory region to heat the same to a comparatively low temperature by the sensible heat of such products of combustion, running the producer with a draft current containing steam, producing a fog of misted oil free of droplets of sensible size, droplets of sensible size being settled out of said fog and removed prior to any cracking action upon the same, admixing such fog with the water gas in regulated amounts and then passing the fog of water gas and oil through the heated refractory region to carburet said gas.

4. The process of making water gas which consists in blowing up a producer with an accelerated air draft current, introduced at such pressure and speed as to form substantially only carbon dioxid, passing the products of complete combustion so formed through a refractory region to heat the same to a comparatively low temperature, running the producer with a draft current containing steam and carbureting the thus produced water gas in the refractory region by a fog of misted oil produced by crossing jets of oil introduced under pressure of over 30 pounds.

5. In the carbureting of water gas, the process which consists in producing a fog of misted oil free of droplets of sensible size, droplets of sensible size being settled out and removed prior to any cracking action upon the same, mixing said fog with water gas and passing the admixed gas and fog through a heated refractory region to carburet said gas.

6. In the carbureting of water gas, the process which consists in producing a fog of misted oil in a comparatively large chamber, allowing said fog to remain in said chamber in a comparatively slow-moving state to permit gross particles of oil to settle out, removing such gross particles for re-introduction, mixing the fog which has been freed of droplets of sensible size with water gas and passing the admixed fog and water gas through a heated refractory region to carburet said gas.

7. In the carbureting of gases, the process which consists in misting oil by spraying said oil under heavy pressure into a comparatively cool chamber, producing a forward movement of the fog thus produced out of the chamber into the gas to be carbureted by separate introduction of a gaseous vehicle into the chamber and separately removing droplets of sensible size.

8. In the carbureting of gases, the process which consists in misting oil by spraying said oil under heavy pressure into a comparatively cool chamber, producing a forward movement of the fog thus produced out of the chamber into the gas to be carbureted by separate introduction of portions of steam and separately removing droplets of sensible size.

9. In the carbureting of gases, the process which consists in misting oil by spraying said oil under heavy pressure into a chamber in crossing jets, removing drops of oil of sensible size from said chamber and producing a forward movement of the oil-fog in the chamber by separate introduction of a gaseous vehicle into said chamber.

10. In the process of making enriched water gas, the process which consists in blowing up a gas producer with an accelerated air draft current, introduced at such pressure and speed as to form substantially only carbon dioxid in the producer, passing the products of complete combustion thus formed through a checkerwork to heat the same to a comparatively low temperature, running the producer with a draft current containing steam, producing an oil-laden fog free of droplets of sensible size in a chamber by crossing jets, admixing a portion of such fog with the water gas formed in the steam blow and passing the mixture through the heated checkerwork.

In testimony whereof I affix my signature, in the presence of two witnesses.

HENRY L. DOHERTY.

Witnesses:
FLETCHER P. SCOFIELD,
F. A. CHAMBERLAIN.